United States Patent [19]

Scodino

[11] 4,234,268
[45] Nov. 18, 1980

[54] APPARATUS FOR RECOVERING, BY MEANS OF A PIPELAYING CRAFT, PIPES LAID ON DEEP SEA BEDS

[75] Inventor: Ambrogio Scodino, San Donato Milanese, Italy

[73] Assignee: Saipem, S.p.A, Milan, Italy

[21] Appl. No.: 21,949

[22] Filed: Mar. 19, 1979

[30] Foreign Application Priority Data

Jul. 28, 1978 [IT] Italy ............................. 26236 A/78

[51] Int. Cl.³ .................... F16L 1/00; F16L 55/12
[52] U.S. Cl. .................................. 405/158; 405/173
[58] Field of Search ............. 405/158, 159, 160, 161, 405/156, 154, 170, 162, 168, 169, 171

[56] References Cited

U.S. PATENT DOCUMENTS

| 3,578,233 | 5/1971 | Meister | 405/156 X |
|---|---|---|---|
| 3,751,932 | 8/1973 | Matthews | 405/173 |
| 3,842,612 | 10/1974 | Arnold | 405/173 |
| 4,028,903 | 6/1977 | Dietrich | 405/170 |
| 4,041,719 | 8/1977 | Baugh | 405/169 |
| 4,068,492 | 1/1978 | Reneau | 405/170 |
| 4,091,514 | 5/1978 | Motes-Conners | 405/156 X |

FOREIGN PATENT DOCUMENTS 569220 11/1975 Switzerland ..................... 405/170

Primary Examiner—Dennis L. Taylor
Attorney, Agent, or Firm—Morgan, Finnegan, Pine, Foley & Lee

[57] ABSTRACT

For lifting from deep sea beds a pipeline trunk, a device is disclosed which is composed by a compact framework of square outline which supports a sealing and pulling head and paired jaw assemblies having sloping surface seats to engage the outer surface of the pipe to be lifted, said jaws being actuated by hydraulic and pneumatic motive means so as to grip the pipe surface firmly. A pipe-cutting device is also provided, which has two discrete cutting units, and the sealing and pulling head is removable from said frame and can be both slid and rotated as to position it correctly coaxially with the pipe trunk.

5 Claims, 4 Drawing Figures

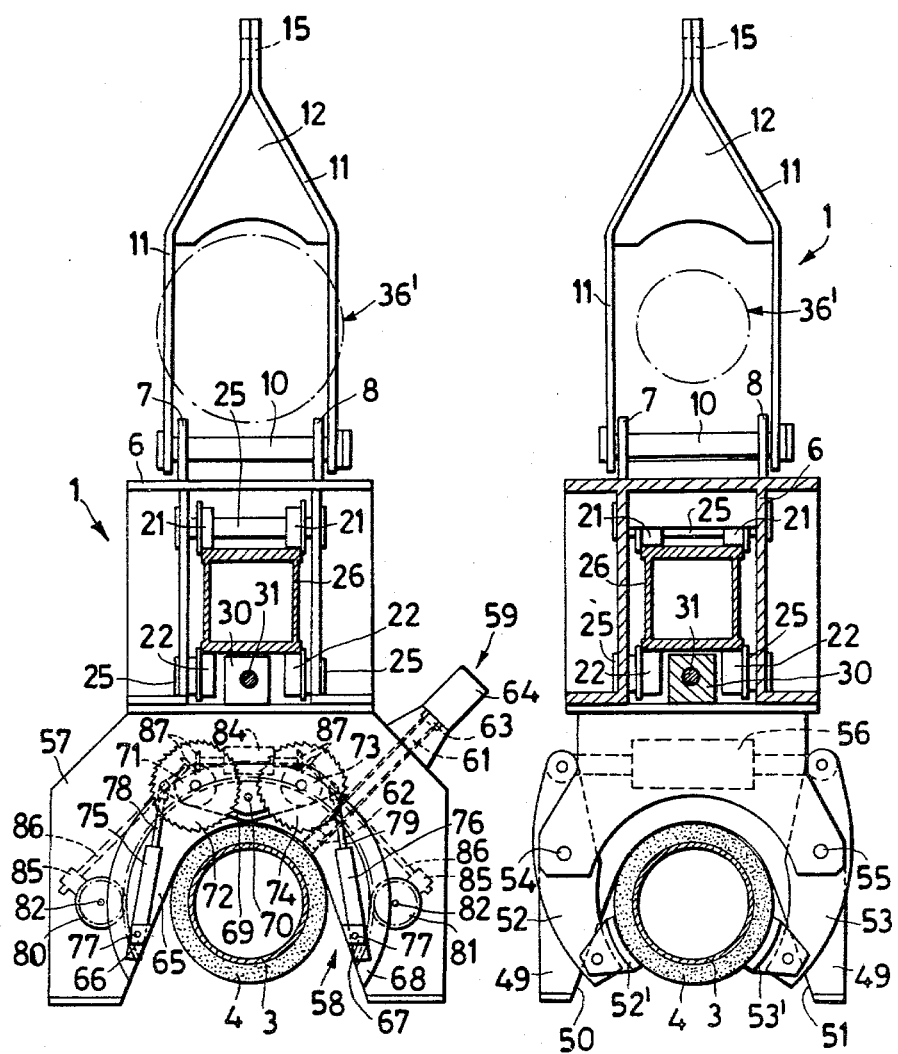

APPARATUS FOR RECOVERING, BY MEANS OF A PIPELAYING CRAFT, PIPES LAID ON DEEP SEA BEDS

This invention relates to an apparatus which, by using a framework of minimum overall dimensions and weight which is fitted inter alia with clamping grips comprising lead-in surfaces, with separate means for cutting the different materials making up the pipe, and with a longitudinally slidable beam which at one rotatable end removably supports a composite longitudinal head arranged for insertion into the pipe to be recovered, these devices being the most suitable for satisfying the various operations involving clamping and pulling the pipe to be recovered and evacuating water therefrom in both directions, makes the recovery, by a pipelaying craft, of damaged or undamaged pipes laid even on deep sea beds more simple, economical and safer. More specifically, the invention relates to improvements in apparatus for recovering pipes by a pipelaying craft, as described in U.S. Patent Application No. 770,854 filed on Feb. 22, 1977, now abandoned.

Said known apparatus consists substantially of a strong support framework for the sealing and pulling head to be inserted into the pipe to be recovered, consisting of a double triangular trellis frame extending vertically, which is guided on the pipe by a guide ring releasably mounted on the end of a bracket projecting from one side of said framework, and in which a guide cable is inserted and stretched between the pipelaying craft and said pipe, the framework being clamped on to the pipes by pairs of hydraulically operated jaws provided below the framework, where there is also provided a cutting device consisting of two half rings hinged together and closable to form a ring about the pipe by means of a hydraulic double acting cylinder, these rings constituting a guide for a carriage movable along them by means of a hydraulic motor, said carriage comprising a vertical guide along which it can be moved by a second hydraulic motor, and comprising also a cutting disc which can be rotated by a third hydraulic motor. Said sealing and pulling head is traversed axially by a discharge tube, is provided with a transverse bore in proximity to one of its ends, and is provided at its other nose-shaped end with an automatic coupling system for the pulling cable for lifting the pipe to be recovered on to the pipelaying craft, said head being supported vertically on the other side of said framework by means of a carriage which can slide, driven by a hydraulic motor, along a vertical rod hinged lowerly to said framework and which can be tilted by means of telescopic hydraulic jacks. Finally, the framework is provided with means for perforating the pipe and for inserting a locking pin provided with shoulder teeth into said transverse bore in said sealing and pulling head once this has been inserted into the pipe, said means consisting substantially of a hydraulic cylinder supported vertically by said framework and made to rotate about its longitudinal axis by a hydraulic motor, to the piston of which is screwed said locking pin provided lowerly with a cutter.

Such an apparatus has various drawbacks, the first of which derives from the fact that in order to vertically support the sealing and pulling head, a framework is required which is very high and therefore very bulky and consequently weighty, this requiring the use of high power lifting equipment on board the craft, with a consequent increase in the cost of the work necessary for recovery. In addition, the large overall size of known apparatus considerably increases the difficulties involved in mounting it on the pipe to be recovered, particularly in strong underwater currents. A further drawback of known apparatus is that because of the short distance between them, the pairs of jaws used for clamping the framework on to the pipe can induce a moment in the end part of the pipe to be lifted which can cause distortion or kinking of said end part of the pipe. In addition, according to the depth and conditions of the sea, the pipe lying on the sea bed is often frequently covered with a layer of reinforced concrete over the bitumen or plastic coating, in order to give it the weight necessary to keep it fixed on the sea bed under strong current conditions. It is apparent that such a pipe coated with concrete both considerably complicates the cutting operation, which requires more time to be effected, and also leads to easy fracture of the single cutting disc of known apparatus. A further drawback of known apparatus is due to its poor flexibility, which does not permit it to carry out the multiplicity of different functions which distinguish one type of lifting or recovery operation from another. In other words, in known apparatus the sealing and pulling head is locked inside the pipe to be recovered only by pinning. This pinning operation, which requires considerable time for perforating the pipe and the once-only use of a special locking pin provided with shoulder teeth, is very costly to the extent that while its use is justified in recovering under poor sea conditions large diameter heavy pipes from which the filling water has not been evacuated, it is absolutely uneconomical in recovering pipes of modest weight or pipes from which the filling water has already been evacuated, and in particular under good sea conditions, in which it would be sufficient to simply lock the head by means of radially mobile shoes which would not require perforating the pipe. Again, in the case of known apparatus the water which fills a pipe can only be evacuated in the direction from the pipe to the head, and not in the opposite direction as is sometimes required. This impossibility is due both to the absence of an emptying ball or cylinder in the head, and also to the lack of an effective sealing system between the head and pipe which prevents losses in the pneumatic thrust necessary for driving said emptying ball or cylinder. The object of the present invention is to obviate said drawbacks and to provide an apparatus for recovering pipes by a pipelaying craft, which is highly reliable so as to allow simple, economical and safe recovery of a pipe whatever the conditions of the sea, and using the operations most suitable for this purpose.

This is attained substantially by using a longitudinally extending framework of square cross-section which, besides eliminating kinking by virtue of the fact that the pairs of jaws can be disposed at a distance apart, also has a very low overall size in that the sealing and pulling head is removably supported longitudinally above said framework, means being provided for axially sliding and rotating said head so as to automatically position it coaxially to the pipe and to insert it therein; using pairs of jaws provided with inclined surface seats to facilitate seating the framework on the pipe to be recovered; using a new cutting device provided with two separate cutters for cutting the covering concrete and for cutting the actual pipe respectively; and using a composite head in the form of three separable cylindrical members, the first cylindrical member of which is provided with a central tube, and, at that end to be inserted into the pipe, a transverse inclined bore for pinning the head to said pipe, at which said tube forms a loop, and is also provided with a locking mechanism in the form of radially movable shoes which is operated by remote control by the energy provided by hydro-pneumatic accumulators incorporated in said first cylindrical element, and with a system for coupling to a second cylindrical member which is provided with a central channel which is connected by way of a loop at one of its ends to said loop formed by the tube of said first cylindrical member, and is also provided with a sealing mechanism based on the axial compression of plastic seal rings, which is operated by remote control by said hydro-pneumatic accumulators by way of hydraulic lines which mate in both said cylindrical members, and with a toothed system for coupling to, and which can be decoupled remotely from, a third cylindrical member which acts as an emptying cylinder or pig, and is removably supported by a portion of said central channel of said second cylindrical member, which, emerging from said second member, is inserted into said third cylindrical member as far as a thrust chamber of this latter.

More specifically, according to one characteristic of the present invention, the apparatus for recovering, by means of a pipelaying craft, a pipe laid on deep sea beds, comprises a longitudinally extending framework of square cross-section, in which a beam is slidably supported axially by means of four pairs of running wheels disposed in opposing pairs, and terminates at one end in the form of a shoulder plate or stop, from which a pivot extends outwards for rotating an upwardly projecting bridge which at its upper end, supports, releasably by remote control, a sealing and pulling head disposed longitudinally, said bridge being made to rotate about said rotation pivot by a remote controlled hydraulic motor fixed thereto, on the drive shaft of which there is keyed a gear wheel which engages with a second gear wheel keyed on to said rotation pin, said beam being made to slide longitudinally by a remote controlled double acting hydraulic cylinder disposed longitudinally and supported by said framework, its piston being rigidly connected to said shoulder plate of said beam by means of a rod.

In this manner, as the sealing and pulling head is supported longitudinally above the framework, it is possible to provide a structure of very small overall size and therefore easy to use. The operation of locating the sealing and pulling head in front of the end of the pipe to be recovered, and of inserting this latter into said pipe consists of sliding said beam, and consequently the head, outwards from the framework by operating said double acting cylinder, rotating said head through 180° by operating said hydraulic motor, and finally inserting the head into the pipe by sliding said beam in the direction opposite to the former direction, by operating said double acting hydraulic cylinder.

According to a further characteristic of the present invention, the two pairs of hydraulically operated jaws for clamping the framework on to the pipe to be recovered are mounted at a great distance apart below said framework by way of inclined surface seats.

In this manner, kinking is prevented, and the seating of the apparatus on the pipe to be recovered is facilitated.

A further characteristic of the present invention is that the cutting device for cutting the possibly damaged part of the pipe to be recovered is constituted by a circular toothed ring split lowerly along inclined planes to allow and facilitate its seating on said pipe to be recovered, and which, supported rotatably within a circular guide formed by a support block of substantially inverted U shape fixed below said framework, comprises, hinge-mounted within its upper central region, a swivel axle at the ends of which are mounted two hydraulic motors, the drive shafts of which are rigid with a cutter for cutting the concrete covering the pipe, and with a cutter for cutting the steel part of the pipe respectively, said swivel axle being inclined downwards at one end or the other end by two double acting hydraulic cylinders hinged to the bottom of said circular toothed split ring and to opposing sides thereof, their piston rods being hinged respectively to the ends of said swivel axle, and said circular toothed ring being rotated by two drive gears which, engaging therewith and supported rotatably on the two opposing sides of said inverted U support block, are mechanically connected by way of a worm, a spindle and two bevel gears, to the ends of the drive shaft of a hydraulic motor supported by said inverted U support block.

In this manner, by operating one or other of the two hydraulic cylinders, it is possible to exert pressure on the pipe to be cut, and thus operate one or other of said two cutters, while the use of two separate drive gears for rotating the circular toothed ring ensures that this rotates completely through 360°, even though it is not completely closed.

Finally, according to a further characteristic of the present invention, the sealing and pulling head is constituted, as already stated, by a composite structure comprising three separable cylindrical members, of which the first cylindrical member is provided with the central tube, and, at that end to be inserted into the pipe, with said transverse bore into which the locking pin provided with shoulder teeth is inserted for pinning the head to the pipe to be recovered, and is also provided with a locking mechanism in the form of radially mobile shoes operated by remote control by the energy provided by hydro-pneumatic accumulators incorporated in said first cylindrical member, and with a univocal system for coupling to a second cylindrical member provided with a corresponding central channel and a mechanism for sealing by means of axial compression of plastics seal rings, which is operated by remote control by said hydro-pneumatic accumulators through hydraulic lines which mate in both said first and second cylindrical members, and with a toothed system, for coupling to and for remotely uncoupling from a third cylindrical member which acts as an emptying cylinder or pig, and is removably supported by a support block containing said central channel of said second cylindrical member which, projecting from said second cylindrical member, is inserted into said third cylindrical member as far as a thrust chamber of this latter.

In this manner, according to the sea conditions and the type of pipe to be recovered, the head can be locked inside the pipe in the most satisfactory manner, either by using the locking pin or by using said locking mechanism in the form of radially mobile shoes, or both systems. By using the head complete with said second and third cylindrical members, it is now possible to evacuate water from the pipe even in the direction from the head to the pipe, in which case said central tube of the first and second cylindrical head members is used not as a discharge tube for the water in the pipe, but as a feed tube for feeding the necessary pneumatic thrust into the pipe for driving the third cylindrical head member or emptying cylinder, said pneumatic thrust being supplied by storage cylinders arranged inside the first head member, or by a hose connected to said first head member and originating from the pipelaying craft.

In order to prevent any loss of said pneumatic thrust, which would obviously occur if said transverse bore in the head passed through the central tube, according to a further characteristic of the present invention said central tube of the first cylindrical head member forms a loop at said transverse bore provided in that end of said first cylindrical member to be inserted into the pipe, and said central channel of the second cylindrical head member also forms a corresponding loop at that end of said second cylindrical member which faces said first cylindrical member, the two said loops being such that they are aligned and mate when said first and 2nd cylindrical head members are coupled together.

Further characteristics of the invention will be apparent from the description given hereinafter with reference to the accompanying drawings of one preferred embodiment, illustrated by way of non-limiting example only, in that technical and constructional modifications may be made thereto without leaving the scope of the present invention.

In said drawings:

FIG. 1 is a partly sectional diagrammatic side view of the recovery apparatus according to the invention already clamped to the pipe to be recovered which is separated slightly from the sea bed, the damaged portion of pipe having already been cut and the sealing and pulling head being already located in front of the end of the pipe to be recovered, said figure also showing by dashed lines the position which the sealing and pulling head assumes when at rest, i.e. while the apparatus is being lowered by the pipelaying craft;

FIG. 2 is a front section on the line AA of FIG. 1, but to a different scale;

FIG. 3 is a front section on the line BB of FIG. 1, but to a different scale;

Figure 4:
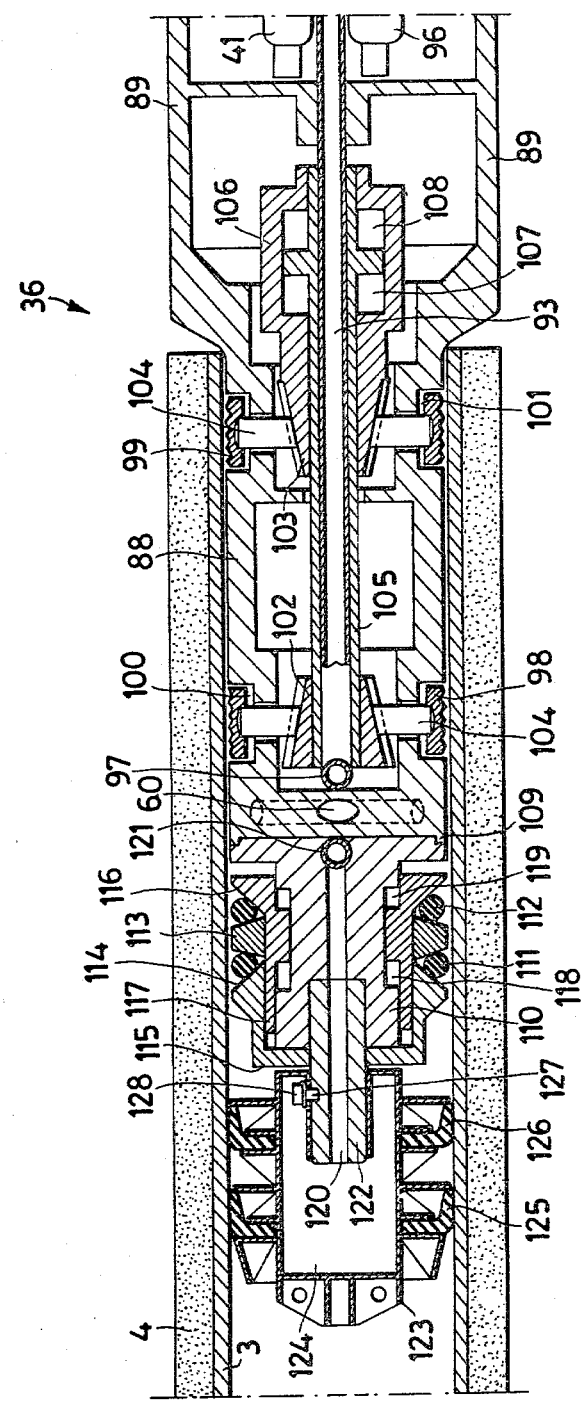
FIG. 4 is an enlarged partial side sectional view of the sealing and pulling head according to the invention, already inserted into the pipe to be recovered.

With reference to the figures, the reference numeral 1 indicates overall the apparatus according to the invention for recovering from the sea bed 2 a pipe 3 covered with a layer of concrete 4, after cutting the damaged pipe portion 5. Said apparatus is constituted by a hollow framework 6 of square cross-section which extends longitudinally and upperly comprises two opposing ribs 7 and 8 provided with a series of bores 9, between two of which, by means of a through pin 10, there is hinged a support stand 11 strengthened upperly by a strengthening plate 12 which is connected to a support cable 13 originating from the pipelaying craft, by means of a ring 14 inserted into a bore 15 in said stand. The framework 6 is guided on the pipe to be recovered, 3, 4, in a manner substantially analogous to that described in the aforesaid patent application by means of a guide cable 16 stretched between the pipelaying craft and the pipe to which it is fixed by means of a hydraulically tightened clamp 17, and is inserted into a guide ring 18 releasably supported by a double acting hydraulic cylinder 19 at the end of a bracket 20 rigid with one end of the framework. A beam 26 is supported to slide axially, by means of four pairs of running wheels 21, 22, 23 and 24 mounted idly in opposing pairs on pivots 25 supported by the framework 6, the beam, lightened by means of holes 27, terminating at one end in a shoulder plate or stop 28 the purpose of which is to cooperate with the edge of the end 29 of the framework 6. Said beam 26 is driven axially in both directions by a double acting hydraulic cylinder 30 housed in the lower interior of the framework 6, its piston being rigidly connected to said plate 28 by means of the rod 31. Said cylinder 30 is supplied by hydro-pneumatic accumulators 32 housed in the framework 6, and is remotely controlled by a pushbutton on a pushbutton control panel 33 situated on said framework. The shoulder plate 28 of the beam 26 is fitted with a fixed rotation pivot 34 for a vertically projecting bridge 35 which, mounted idly on said fixed pivot, releasably supports a sealing and pulling head 36 disposed longitudinally, its projecting end 37 being dovetail-shaped for insertion into a corresponding dovetail seat provided in a plate 38 rigid with said head 36, and is locked thereto by a through pin 39 rigid with the piston of a double acting hydraulic cylinder 40 fixed to said plate 38. Said cylinder 40 is supplied by hydro-pneumatic accumulators (see FIG. 4) housed in said sealing and pulling head 36, and is remotely controlled by a pushbutton of another pushbutton control panel 42 situated on said head. The bridge 35 is rotated about the pivot 34 by a hydraulic motor 43 supported by said bridge 35, and supplied by said accumulators 41 by way of a further pushbutton on said pushbutton control panel 42. On its drive shaft there is keyed a gear wheel 44 which is constantly engaged with a gear wheel 45 keyed on to said fixed pivot 34, said gear wheels being contained in a compartment provided in said bridge 35.

Figure 1:
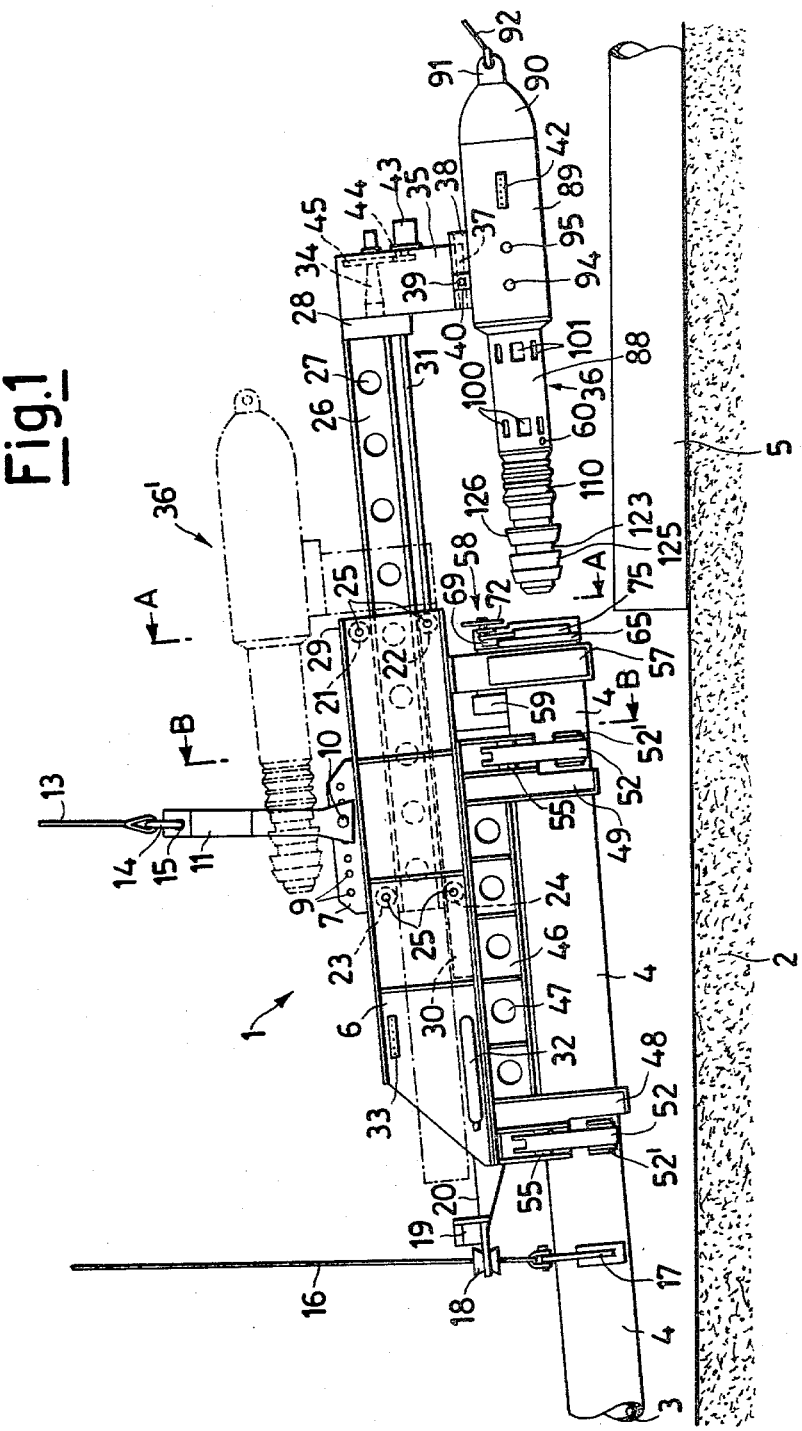

While the apparatus 1 is being lowered by the pipelaying craft on to the pipe to be recovered 3, 4 by means of the support cable 13, said beam 26 is kept inserted inside the framework 6 with its shoulder plate 28 in contact with said edge of the framework end 29, and the projecting bridge 35 is kept rotated upwards. In this manner, the sealing and pulling head 36 is supported longitudinally above the framework 6, as indicated with dashed lines at 36 in FIG. 1, so that the overall size of the apparatus is a minimum.

Below the framework 6 there is fixed a long structure 46 lightened by holes 47, to its distant ends there being fixed two respective seats 48 and 49 having a contour in the form of inclined diverging planes 50 and 51 (see FIG. 3), to facilitate the seating of the apparatus 1 on to the pipe to be recovered. Each seat 48 or 49 supports a pair of jaws 52' and 53', the arms 52 and 53 of which are hinged to said seat by means of pivots 54 and 55 respectively, and are driven to clamp the apparatus to the pipe to be recovered, by a double acting hydraulic cylinder 56 hinged to their ends and supplied by said hydropneumatic accumulators 34 by way of a further pushbutton on the pushbutton control panel 33. Below the framework 6 is fixed a support block 57 substantially in the form of an inverted U, to support a cutting device 58 for cutting the possibly damage pipe portion 5, and a device 59 for perforating the pipe 3, 4 and for inserting a locking pin provided with shoulder teeth into a transverse bore 60 in the sealing and pulling head 36. This latter device 59 is supported by said block 57 in such a manner as to operate, between the pair of jaws supported by the seat 49 and said cutting device 58, in a position in which said transverse bore 60 of the head 36 is located when this latter has been completely inserted into the pipe to be recovered. This occurs when said shoulder plate 28 of the beam 26 makes contact with said edge of the end 29 of the framework 6. The device 59 is practically analogous to that described in the abovementioned patent application, and is constituted substantially by a shoulder toothed locking pin 61 on the bottom of which is screwed a cutter 62 (see FIG. 2), and is screwed at its top to the piston of a hydraulic cylinder 63 which is rotated, together with said pin, by a hydraulic motor 64 supported by said support block 57. Said cutting device 58 is constituted by an externally toothed circular ring 65 (see FIG. 2), which is split lowerly along inclined diverging planes 66 and 67 to facilitate its seating on to the pipe to be recovered 3, 4. Said ring 65 is rotatably supported within a circular guide 68 formed by said inverted U block 57, and supports on its upper central portion a swivel axle 67, which is hinged at its centre by the rotation pin 70, and fitted at its ends with a hydraulic motor 71 rigid with a cutter 72 and another hydraulic motor 73 rigid with a cutter 74 respectively, the two said motors 71 and 73 being supplied by said hydropneumatic accumulators 32 via a pushbutton on said pushbutton control panel 33. The two said cutters 72 and 74, which are generally of different type, one being for cutting the concrete 4 which covers the pipe 3 and the other for cutting the pipe itself, are moved one after the other into the working zone, i.e. they are lowered and pressed against the pipe 3, 4, by two double acting hydraulic cylinders 75 and 76 respectively, hinged to the bottom of said circular toothed ring 65 and to the opposing sides thereof by means of pivots 77. Their piston rods 78 and 79 are hinged to the ends of said swivel axle 69 respectively. Said toothed circular ring 65 is rotated through 360° by two gear wheels 80 and 81 which are constantly engaged with the toothed circular ring and are rotatably supported by pivots 82 on opposing sides of said inverted U support block 57. Each gear wheel derives its motion from the drive shaft of a hydraulic motor 84 supported by said support block 57, through a mechanism consisting of a worm 85 engaged with the gear wheel 80 or 81 and keyed on to a spindle 86 which is connected to one end of said drive shaft of the hydraulic motor 84 by means of a pair of bevel gears 87. All said members 80-87 are obviously supported by said inverted U support block 57 in a suitable cavity therein, and both said double acting hydraulic cylinders 75 and 76 and said hydraulic motor 84 are supplied by said hydro-pneumatic accumulators 32 and are remotely controlled by corresponding pushbuttons on said pushbutton control panel 33.

Finally, said sealing and pulling head 36 is constituted in effect by a composite structure comprising three separable cylindrical members, the first member of which comprises a cylindrical body 88 of such a radius as to be able to be inserted into the pipe to be recovered 3, 4, and is connected to a further cylindrical body 89 of greater radius, which terminates in a nose-shaped cap 90 provided with a system 91 for the automatic coupling of the pulling cable 92 for lifting the pipe to be recovered on to the pipelaying craft, said system 91 being analogous to that described in the aforesaid patent application.

Said first cylindrical member 88, 89 of the head 36 is traversed axially by a central tube 93 (see FIGS. 1 and 4) which opens on the outside of the head, on one side of said body 89, through a discharge nozzle 94 provided with a non-return valve. The central tube 93 is also connected to another nozzle 95 for a hose originating from the pipelaying craft, through which the necessary gas can be fed into said tube for driving an emptying cylinder for expelling the water filling the pipe in a direction from the head to the pipe, said nozzle being also situated on said side of the body 89, and being provided with a non-return valve. The central tube 93 is also connected directly through a conduit provided with a non-return valve, not shown on the figure, to a system of storage cylinders 96 housed in a chamber in said body 89, and filled with said gas for driving the emptying cylinder.

Said non-return valves are operated by said hydropneumatic accumulators 41 housed in a chamber in said body 89, under remote control by means of pushbuttons on said pushbutton control panel 42 situated on said side of the body 89. At the end of the cylindrical body 88 of the first head member there is provided said transverse bore 60 into which said boring device 59 inserts a locking pin provided with shoulder teeth. To prevent said transverse bore 60 also going through the central tube 93, thus leading to leakages, this latter forms an elbow or loop 97 at the level of said bore. The cylindrical body 88 of the first member of the head 36 is also provided with a locking mechanism in the form of radially mobile shoes. Said mechanism, substantially analogous to that already described in our Italian Pat. No. 983 826 granted on Nov. 11, 1974, is constituted in practice by two sets of shoes 98 and 99 which are moved radially against the inner surface of the pipe 3, passing through corresponding apertures 100 and 101 provided in the body 88, by means of two corresponding sets of opposing wedges 102 and 103 which cooperate with the vertical cylinders 104 of said shoes, and are rigid respectively with two sliders 105 and 106 slidable longitudinally and telescopically along said central tube 93. These sliders define between them two expansion chambers 107 and 108 which are connected via control valves, not shown on the figure, to said hydropneumatic accumulators 41, said valves being controlled by pushbuttons on said pushbutton control panel 42. Finally, said cylindrical body 88 is provided at its end with projecting stops 109 which become inserted into suitable guides in the second separable cylindrical member 110 of the head 36 to univocally couple said second member 110 to the first member 88, 89 of said head, said coupling being made in any manner, for example by means of screw coupling. The second cylindrical member 110 of the head 36 is provided with a sealing mechanism comprising axial compression of plastics rings, which is substantially analogous to that already described in our said Italian Pat. No. 983 826, and is constituted in practice by two plastics seal rings of toroidal cross-section 111 and 112, which are separated from each other by a longitudinally slidable metal ring 113 of trapezoidal cross-section. They are compressed axially against the inclined walls of said ring 113, and, respectively, against the inclined fixed wall 114 of a block 115 rigid with the end of said second cylindrical member 110, and the inclined mobile wall 116 of a slider 117 slidable longitudinally and telescopically on the body of said second cylindrical member 110, with which said slider forms two expansion chambers 118 and 119 which are connected to said hydropneumatic accumulators 41 by two hydraulic conduits, not shown on the figure and provided in said second cylindrical member 110, and by a further two hydraulic conduits which are aligned and mate with the first, these also not being shown on the figure but being provided on said first cylindrical member 88, 89 of the head 36. The mating between the corresponding conduits is ensured by said univocal coupling between the first and second cylindrical head member. Said expansion chambers 118 and 119 are supplied via pushbuttons on said pushbutton control panel 42, which operate the control valves in said conduits. Said second member 110 of the head 36 is also provided axially with a central channel 120 which, at the end facing the body 88 of said first cylindrical head member, is in the form of an elbow or loop 121 corresponding to said loop 97 of the central tube 93, so that when the two said loops 93 and 121 are aligned and mating by virtue of said univocal coupling, the central channel 120 constitutes an extension in the second cylindrical member 110, of the central tube 93 of the first cylindrical member 88, 89 of the head 36. Said central channel 120 of the second cylindrical member 110 of the head 36 extends at its other end in a cylindrical support block 122 projecting from said second member 110, which is inserted into a corresponding bore provided in the third cylindrical member 123 of the head 36, and terminates in a thrust chamber 124 in said third cylindrical member 123. This latter cylindrical member 123, which acts as an emptying cylinder or pig for evacuating water from the pipe 3, 4 in the direction from the head to the pipe, is provided with plastics seal rings 125 and 126, and is removably retained on said support block 122 by a stop tooth coupling system, which can be disengaged remotely and consists of a stop tooth 127 which is rigid with the piston of a hydraulic double acting cylinder 128 supported by said third cylindrical member 123. This stop tooth can be inserted into or withdrawn from a corresponding bore provided in said support block 122, by means of pushbuttons on said pushbutton control panel 42 which control the supply to said cylinder 128 from said hydro-pneumatic accumulators 41 by way of mating conduits provided in said cylindrical members constituting the sealing and pulling head 36.

I claim:

1. An apparatus for recovering, by means of a pipelaying craft, a pipe coated with concrete and laid on deep sea beds, comprising a framework for removably supporting, and inserting into said pipe, a sealing and pulling head traversed axially by a central tube and provided with a transverse bore in proximity to that end thereof to be inserted into the pipe, and provided at its other nose-shaped end with a system for automatically coupling a pulling cable for raising the pipe to be recovered on to the pipelaying craft, said apparatus being guided on to the pipe to be recovered by means of a guide ring releasably mounted to the end of a bracket projecting from one side of said framework, and through which there is inserted a guide cable stretched between the pipelaying craft and said pipe, and being provided at its lower end with two pairs of hydraulically operable jaws for clamping the framework on to the pipe to be recovered, with a cutting device for cutting the possible damaged part of the pipe to be recovered, and with means for perforating the pipe and for inserting a locking pin provided with shoulder teeth into said transverse bore in said sealing and pulling head when this latter has been inserted into the pipe to be recovered, wherein said framework extends longitudinally with a square cross-section, in which a beam is slidably supported axially by means of four pairs of running wheels disposed in opposing pairs, and terminates at one end in the form of a shoulder plate or stop, from which a pivot extends outwards for rotating an upwardly projecting bridge which at its upper end supports, releasably by remote control, said sealing and pulling head disposed longitudinally, said bridge being made to rotate about said rotation pivot by a remote controlled hydraulic motor fixed thereto, on the drive shaft of which there is keyed a gear wheel which engages with a second gear wheel keyed on to said rotation pin, said beam being made to slide longitudinally by a remote controlled double acting hydraulic cylinder disposed longitudinally and supported by said framework, its piston being rigidly connected to said shoulder plate or stop of said beam by means of a rod.

2. An apparatus as claimed in claim 1, wherein the said two pairs of hydraulically operated jaws for clamping the framework on to the pipe to be recovered are mounted at a great distance apart below said framework by way of inclined surface seats.

3. An apparatus as claimed in claim 1, wherein said cutting device for cutting the possibly damaged part of the pipe to be recovered is constituted by a circular toothed ring split lowerly along inclined planes to allow and facilitate its seating on said pipe to be recovered, and which, supported rotatably within a circular guide formed by a support block of substantially inverted U shape fixed below said framework, comprises, hinge-mounted within its upper central region, a swivel axle at the ends of which are mounted two remote controlled hydraulic motors, the drive shafts of which are rigid with a cutter for cutting the concrete covering the pipe, and with a cutter for cutting the steel part of the pipe respectively, said swivel axle being inclined downwards at one end or the other end by two double acting hydraulic cylinders hinged to the bottom of said circular toothed split ring and to opposing sides thereof, their piston rods being hinged respectively to the ends of said swivel axle, and said circular toothed ring being rotated by two drive gears which, engaging therewith and supported rotatably on the two opposing sides of said inverted U support block, are mechanically connected by way of a worm, a spindle and two bevel gears, to the ends of the drive shaft of a hydraulic motor supported by said inverted U support block.

4. An apparatus as claimed in claim 1, wherein said sealing and pulling head is constituted by a composite structure comprising three separable cylindrical members, of which the first cylindrical member is provided with said central tube, and, at that end to be inserted into the pipe, with said transverse bore into which said locking pin provided with shoulder teeth is inserted for pinning the head to the pipe to be recovered, and is also provided with a locking mechanism in the form of radially mobile shoes operated by remote control by the energy provided by hydro-pneumatic accumulators incorporated in said first cylindrical member, and with a univocal system for coupling to a second cylindrical member provided with a corresponding central channel and a mechanism for sealing by means of axial compression of plastics seal rings, which is operated by remote control by said hydro-pneumatic accumulators through hydraulic conduits which mate in both said first and second cylindrical members, and with a toothed system for coupling to and for remotely uncoupling from a third cylindrical member which acts as an emptying cylinder or pig, and is removably supported by a support block containing said central channel of said second cylindrical member which, projecting from said second cylindrical member, is inserted into said third cylindrical member as far as a thrust chamber of this latter.

5. An apparatus as claimed in claim 1, wherein said central tube of said first cylindrical head member forms a loop at said transverse bore provided in that end of said first cylindrical member to be inserted in the pipe, and said central channel of said second cylindrical head member also forms a corresponding loop at that end of said second cylindrical member which faces said first cylindrical member, the two said loops being such that they are aligned and mate when said first and second cylindrical head members are coupled together.

* * * * *